(12) United States Patent　　(10) Patent No.: US 9,131,049 B2
Chemudugunta et al.　　(45) Date of Patent: Sep. 8, 2015

(54) MULTI-CHANNEL END-TO-END HOSTED CALL RECORDING SYSTEM FOR IVR-CALL CENTER ANALYTICS

(75) Inventors: Karunakar R. Chemudugunta, Milpitas, CA (US); Jaynth Thiagarajan, San Jose, CA (US); Sridhar Raghavan, Santa Clara, CA (US)

(73) Assignee: Nuance Communications, Inc., Burlington, MA (US)

( * ) Notice: Subject to any disclaimer, the term of this patent is extended or adjusted under 35 U.S.C. 154(b) by 45 days.

(21) Appl. No.: 13/370,739

(22) Filed: Feb. 10, 2012

(65) Prior Publication Data

US 2013/0208874 A1　Aug. 15, 2013

(51) Int. Cl.
*H04M 1/64*　　(2006.01)
*H04M 3/493*　(2006.01)
*H04M 3/42*　　(2006.01)
*H04M 3/58*　　(2006.01)
*H04M 3/51*　　(2006.01)

(52) U.S. Cl.
CPC .......... *H04M 3/493* (2013.01); *H04M 3/42221* (2013.01); *H04M 3/58* (2013.01); *H04M 3/5175* (2013.01)

(58) Field of Classification Search
CPC ..................................................... H04M 1/64
USPC ........ 379/88.01, 88.18, 88.27, 121.05, 266.1, 379/265.11, 88.04, 212.01, 272
See application file for complete search history.

(56) References Cited

U.S. PATENT DOCUMENTS

| | | | |
|---|---|---|---|
| 6,904,143 B1 | 6/2005 | Peterson et al. | |
| 8,275,115 B1 * | 9/2012 | Everingham et al. | 379/265.02 |
| 2004/0235509 A1 * | 11/2004 | Burritt et al. | 455/519 |
| 2006/0262919 A1 * | 11/2006 | Danson et al. | 379/265.02 |
| 2011/0116492 A1 | 5/2011 | Byron et al. | |

FOREIGN PATENT DOCUMENTS

EP　　2627064 A1　8/2013

* cited by examiner

*Primary Examiner* — Yosef K Laekemariam
(74) *Attorney, Agent, or Firm* — Hamilton, Brook, Smith & Reynolds, P.C.

(57) ABSTRACT

A telephone call is connected through a caller transfer point in a PSTN to a call recorder in a private hosted telephony network for making an audio recording of the telephone call. The telephone call is also connected from the caller transfer point through an IVR transfer point in the PTSN to a remote IVR server for dialog processing of the telephone call. At some point during the dialog process the connection between the call recorder and the IVR transfer point is placed on hold while maintaining a live connection between the call recorder and the caller transfer point. A human agent is then connected through the IVR transfer point to the telephone call for further handling of the telephone call, and the connection to between the IVR transfer point and the call recorder is restored to allow communication between the caller and the human agent.

12 Claims, 3 Drawing Sheets

MULTI-CHANNEL END-TO-END HOSTED CALL RECORDING SYSTEM FOR IVR-CALL CENTER ANALYTICS

TECHNICAL FIELD

The present invention relates to techniques for routing telephone calls to an Interactive Voice Response (IVR) system.

BACKGROUND ART

A telephone call placed to a business organization commonly is handled by an Interactive Voice Response (IVR) system. The IVR system interacts with the caller via automated dialogs that present the caller with prompts that the caller responds to. The responses are automatically classified by the system (using automatic speech recognition, ASR) to determine how to handle the call. Some calls can be handled completely by automated responses of the IVR system, while other calls need to be referred to a human agent for completion.

To optimize the performance of an IVR system, it is helpful to record the individual telephone calls and analyze their details. But recording calls with multiple agent transfers as a single session in a hosted recording system is a problem. Depending on the type of transfer the calls could be dropped during a transfer. In order to do a complete end-to-end recording, a conventional IVR system has to do a bridge (trombone) transfer to the agents. This is expensive because it utilizes twice the telephony resources as would a simple blind transfer require.

SUMMARY

Embodiments of the present invention are directed to handling of a telephone call to an interactive voice response (IVR) system. A telephone call from a caller is connected through a caller transfer point in a public switched telephone network (PSTN) to a call recorder in a private hosted telephony network for making an audio recording of the telephone call. The telephone call is also connected from the caller transfer point through a IVR transfer point in the PTSN to a remote IVR server for dialog processing of the telephone call. At some point during the dialog process the connection between the call recorder and the IVR transfer point is placed on hold while maintaining a live connection between the call recorder and the caller transfer point. A human agent is then connected through the IVR transfer point to the telephone call for further handling of the telephone call, and the connection to between the IVR transfer point and the call recorder is restored to allow communication between the caller and the human agent.

Such embodiments may further include making an audio recording of the telephone call with the call recorder and providing the audio recording to an IVR call analytics application. The IVR server may be disconnected from the telephone call after the human agent has been connected. The step of placing on hold may include processing DTMF tones to maintain the live connection between the call recorder and the caller transfer point. And the dialog processing may use automatic speech recognition (ASR).

Embodiments of the present invention also include a computer program product in a non-transitory computer readable storage medium for handling a telephone call to an interactive voice response (IVR) system according to any of the foregoing methods.

DETAILED DESCRIPTION

Embodiments of the present invention address the problem of dropping calls during call transfers in an IVR system having a call recorder. Two different transfer points are used to route the call: (1) a first caller transfer point in a public switched telephone network (PSTN) that routes a telephone call from a caller to a call recorder in a private hosted telephony network, and (2) a second IVR transfer point in the PSTN that routes the call from the call recorder to the remote IVR server. During an IVR dialog with caller when the IVR server transfers the call (e.g., to a human agent), the transfer signals transmitted from the IVR transfer point are detected and prevented from reaching the caller transfer point to thereby prevent the caller from being disconnected.

Figure 1:
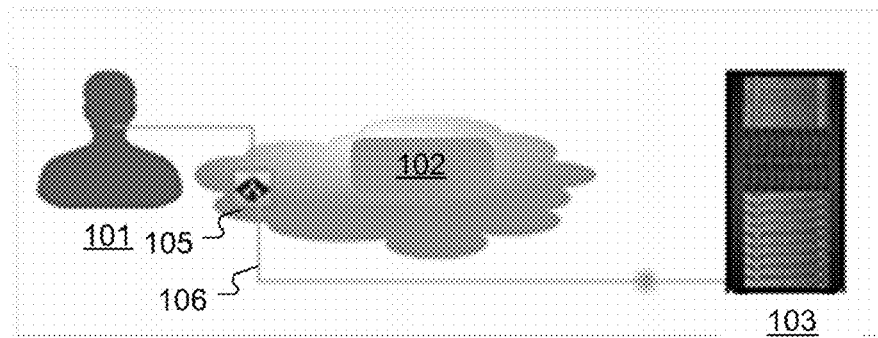
FIG. 1 illustrates the standard call flow for making a telephone call.

FIG. 1 illustrates the standard call flow for making a telephone call. A telephone call 106 is routed from a caller 101 through a transfer point 105 in a PSTN cloud 102 to an IVR server 103, which uses ASR to conduct a dialog with the caller 101. Commonly during this dialog, the IVR server 103 determines that the telephone call 106 needs to be transferred, for example, to human agent to handle some aspect of the call beyond the capability of the automated dialog of the IVR server 103.

Figure 2:
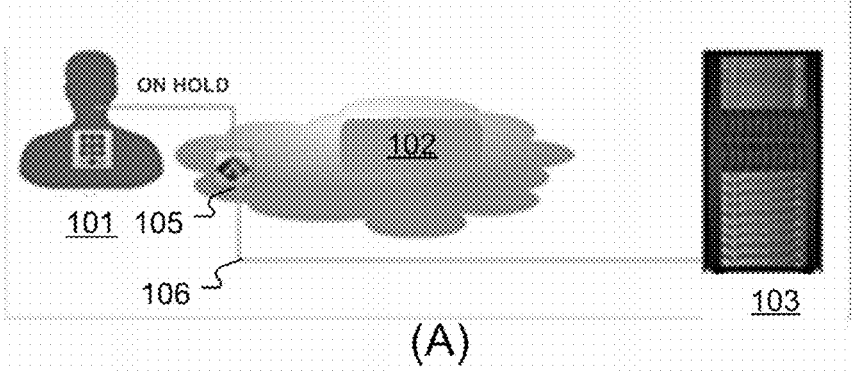
FIG. 2A-B illustrates the standard call flow for transferring a telephone call from an IVR server to a human agent.
Figure 2:
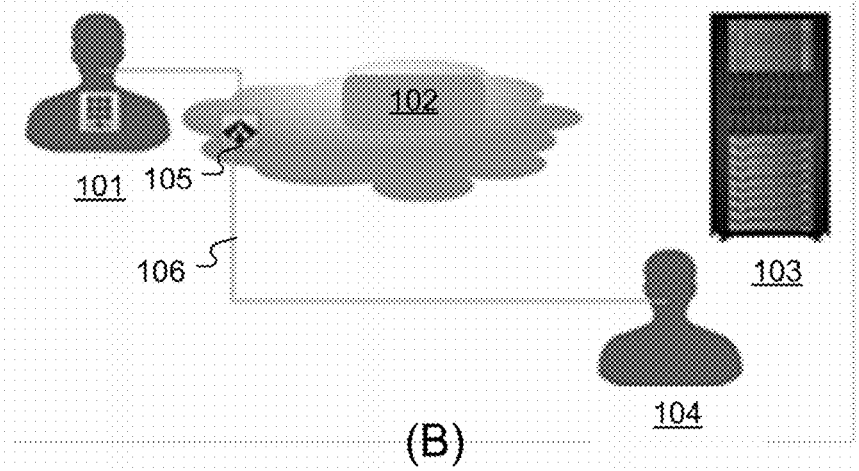

FIG. 2A-B illustrates the standard call flow for a conventional blind transfer of the telephone call 106 from the IVR server 103 to a human agent 104. That is, the IVR server 103 sends a transfer request signal to the transfer point 105, which places its connection to caller 101 on hold, as shown in FIG. 2A. The transfer point 105 then connects the path of the telephone call 106 to the human agent 104 and disconnects the IVR server 103, as shown in FIG. 2B. The human agent 104 then handles further dialog processing with the caller 101 and the IVR server is no longer needed.

Figure 3:
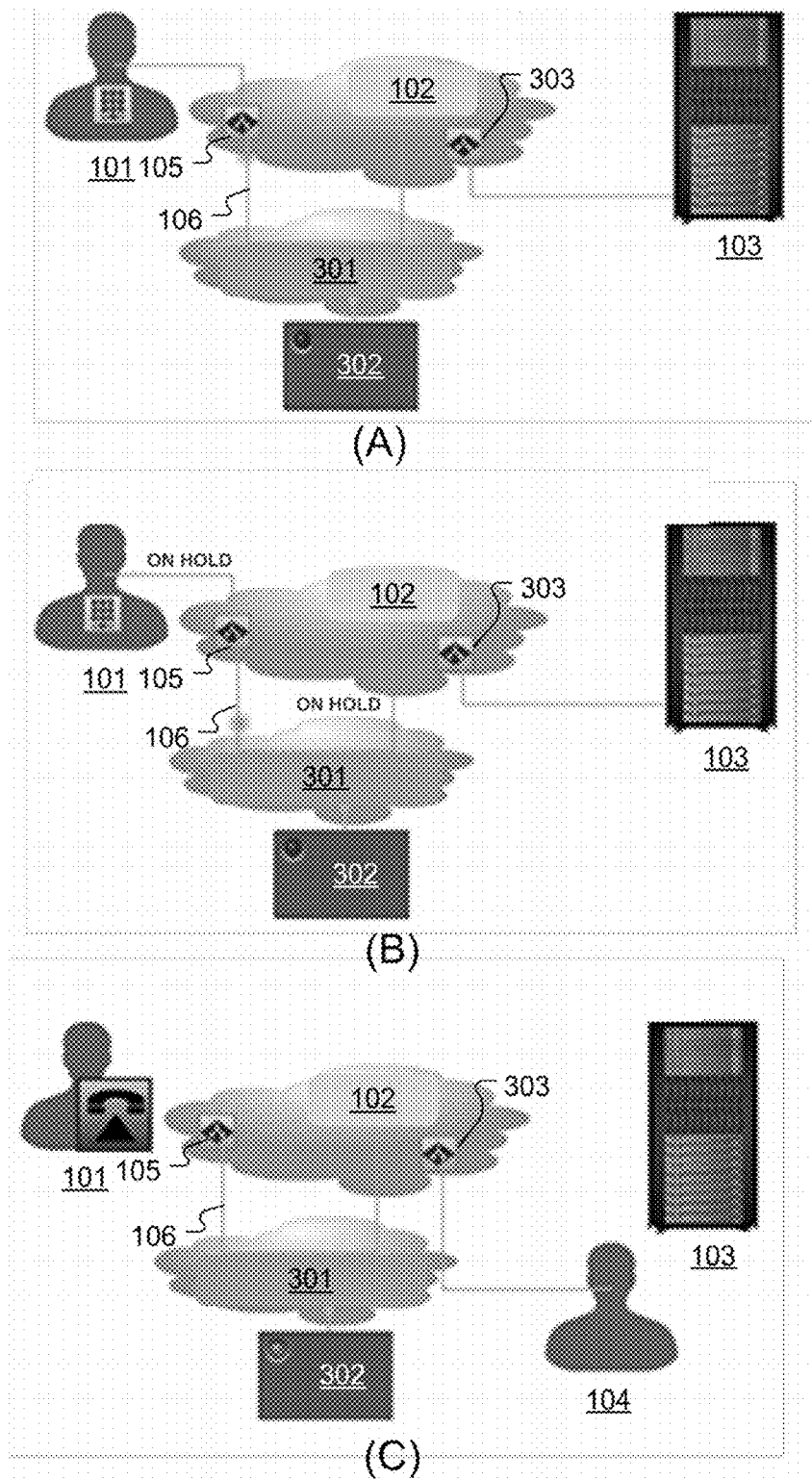
FIG. 3A-C illustrates the call flow use of a standard tap recorder in an IVR application with a transfer.

In order to analyze the operation of an IVR system such as those described, operational data can be collected by recording individual phone calls to the system. To do that, FIG. 3A illustrates the call flow use of a standard tap recorder in an IVR application with a conventional call transfer. A call recorder 302 in a private hosted telephony network 301 makes audio records of telephone calls to the IVR server 103. Telephone calls 106 from callers 101 are connected through a first caller transfer point 105 in the PSTN cloud 102 to the call recorder 302, and from there through a second IVR transfer point 303 in the PTSN 102 to the IVR server 103. This allows the call recorder 302 to make audio recordings of the dialog processing of the telephone call 106 by the IVR server.

But this two transfer point call routing arrangement struggles when the IVR server 103 decides to transfer the telephone call 106 to a human agent 104. To transfer the call 106, the IVR server 103 sends transfer signals to the transfer points within the PSTN cloud 106. As shown in FIG. 3B, both the IVR transfer point 303 and the caller transfer point 105 place the previous portion of the call 106 on hold while both transfer points wait for the transfer destination number. The IVR transfer point 303 receives the destination number from the IVR server 103 and dials it to make a connection with the human agent 104, as shown in FIG. 3C. But the connection between the caller 101 and the caller transfer point 105 is still on hold. Eventually that connection will time out and the caller 101 will be dropped. Thus, the conventional arrangement for using a call recorder fails when a call must be transferred from the IVR server to a human agent for further dialog processing.

Figure 4:
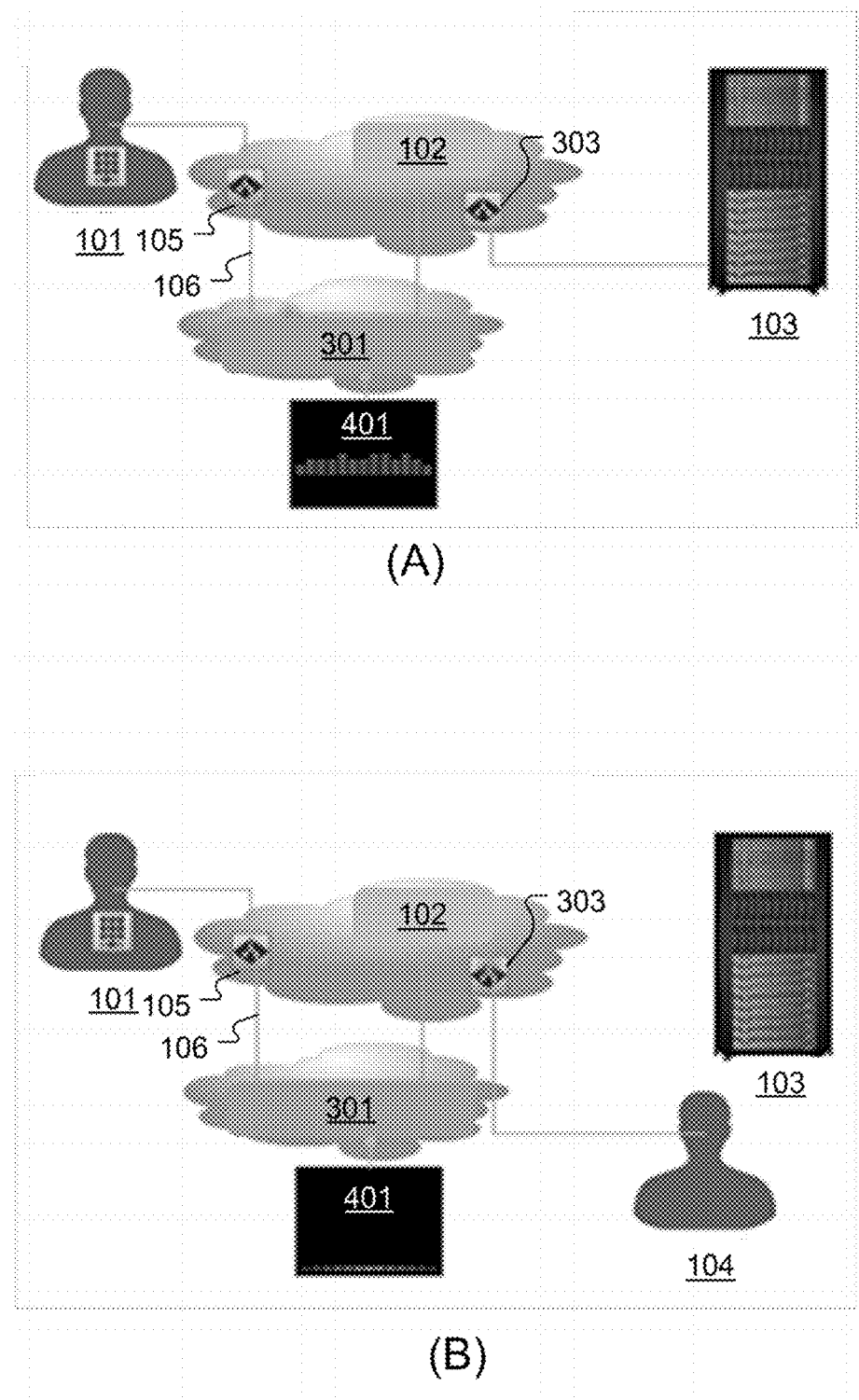
FIG. 4A-B illustrates a call transfer solution according to an embodiment of the present invention.

Embodiments of the present invention are directed to an improved arrangement for capturing audio recordings of telephone calls to an IVR dialog system using an intelligent call recorder which successfully handles transfers to a human agent. As shown in FIG. 4A when the IVR server 103 sends the transfer signals to the transfer points in the PSTN cloud 102, the IVR transfer point 303 places on hold its incoming side of the call 106. But the intelligent call recorder 401 filters out the transfer request to prevent it from reaching the caller transfer point 105, thereby maintaining live the connection of the call 106 between the caller 101 and the intelligent call recorder 401. Thus, the only the portion of the call 106 placed on hold during the transfer is the connection between the intelligent call recorder 401 and the IVR transfer point 303. The IVR server 103 then sends the destination number of the human agent 104 to the IVR transfer point 303 which dials and makes the connection. The human agent 104 is then connected as shown in FIG. 4B through the IVR transfer point 303 to the telephone call 106, the intelligent call recorder 401, and the caller 101.

In addition to or instead of transferring a call from an IVR server to a human agent, some embodiments may advantageously transfer a call from one IVR server to another.

The methodology used to detect and suppress the transfer signals may vary to work across different telephone carriers. For example, a typical implementation may be based on converting in-band DTMF tones from the IVR server 103 to the caller transfer points 303 and 105 into out-of-band DTMF tones and suppressing the same as needed.

Embodiments of the present invention enable a recording arrangement to capture an entire phone call as a single session without interfering with the call audio path or compromising on call quality. This continuity and quality of recording is vital for call analysis applications. And the telephony resources required are no more than for a simple blind transfer and much less than in a bridge (trombone) call routing arrangement.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of handling a telephone call for an interactive voice response (IVR) system, the method comprising:
    accepting a telephone call at a call recorder for making an audio recording of the telephone call, wherein the accepting establishes a first connection from a caller through a caller transfer point in a public switched telephone network (PSTN) to the call recorder located in a private hosted telephony network;
    routing the telephone call from the call recorder to a remote IVR server for dialog processing of the telephone call, wherein the routing establishes a second connection from the call recorder through an IVR transfer point in the PSTN to the remote IVR server;
    routing a transfer signal received by the call recorder to the caller transfer point, the transfer signal sent from the remote IVR server to place on hold the first connection and the second connection, and to transfer the second connection from the remote IVR server to a human agent for further handling of the telephone call; and
    dropping the transfer signal at the call recorder to prevent the transfer signal from reaching the caller transfer point, wherein the dropping maintains the first connection as a live connection during the transfer of the second connection.

2. A method according to claim 1, further comprising:
    making an audio recording of the telephone call with the call recorder.

3. A method according to claim 2, further comprising:
    providing the audio recording to an IVR call analytics application.

4. A method according to claim 1, further comprising:
    disconnecting the IVR server from the telephone call after the human agent has been connected.

5. A method according to claim 1, wherein the step of placing on hold includes processing DTMF tones to maintain the live connection between the call recorder and the caller transfer point.

6. A method according to claim 1, wherein the dialog processing uses automatic speech recognition (ASR).

7. A computer program product in a non-transitory computer readable storage medium for handling a telephone call for an interactive voice response (IVR) system, the product comprising:

program code for accepting a telephone call at a call recorder for making an audio recording of the telephone call, wherein the accepting establishes a first connection from a caller through a caller transfer point in a public switched telephone network (PSTN) to the call recorder located in a private hosted telephony network;

program code for routing the telephone call from the call recorder to a remote IVR server for dialog processing of the telephone call, wherein the routing establishes a second connection from the call recorder through an IVR transfer point in the PSTN to the remote IVR server;

program code for routing a transfer signal received by the call recorder to the caller transfer point, the transfer signal sent from the remote IVR server to place on hold the first connection and the second connection, and to transfer the second connection from the remote IVR server to a human agent for further handling of the telephone call; and program code for dropping the transfer signal at the call recorder to prevent the transfer signal from reaching the caller transfer point, wherein the dropping maintains the first connection as a live connection during the transfer of the second connection.

8. A product according to claim 7, further comprising:
program code for making an audio recording of the telephone call with the call recorder.

9. A product according to claim 8, further comprising:
program code for providing the audio recording to an IVR call analytics application.

10. A product according to claim 7, further comprising:
program code for disconnecting the IVR server from the telephone call after the human agent has been connected.

11. A product according to claim 7, wherein the program code for placing on hold includes program code for processing DTMF tones to maintain the live connection between the call recorder and the caller transfer point.

12. A product according to claim 7, wherein the dialog processing uses automatic speech recognition (ASR).

\* \* \* \* \*